United States Patent [19]

Zirps

[11] 4,352,035
[45] Sep. 28, 1982

[54] ELECTRIC MOTOR OPERATED ADJUSTING DRIVE

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 196,295

[22] Filed: Oct. 14, 1980

[30] Foreign Application Priority Data

Oct. 20, 1979 [DE] Fed. Rep. of Germany ... 7929780[U]

[51] Int. Cl.³ .............................................. H02K 7/06
[52] U.S. Cl. ..................................................... 310/80
[58] Field of Search ................................... 310/80, 83

[56] References Cited

U.S. PATENT DOCUMENTS

| | | | |
|---|---|---|---|
| 2,444,886 | 7/1948 | Vickers | 310/83 UX |
| 2,479,019 | 8/1949 | Ochtman | 310/83 X |
| 2,490,040 | 12/1949 | Frerer | 310/83 X |
| 3,356,874 | 12/1967 | Chiaparelli et al. | 310/80 X |
| 3,898,399 | 8/1975 | Yasui et al. | 310/80 X |
| 4,066,922 | 1/1978 | Henneman et al. | 310/80 |

*Primary Examiner*—Donovan F. Duggan
*Attorney, Agent, or Firm*—Michael J. Striker

[57] ABSTRACT

An electric motor operated adjusting drive has a housing with an opening, a threaded rotary spindle arranged in the housing and having an axis, an adjusting nut arranged on the spindle axially displaceable and non-rotatable, and an adjusting member arranged in the housing and sealed relative to the latter. The adjustment member is actuated by the adjusting nut so as to displace linearly outwardly of the housing through the opening. The adjustment member is formed by a hollow body which is thin-walled and surrounds the threaded spindle. The adjustment member is sealed inwardly relative to the threaded spindle and outwardly relative to the opening of the housing.

19 Claims, 4 Drawing Figures

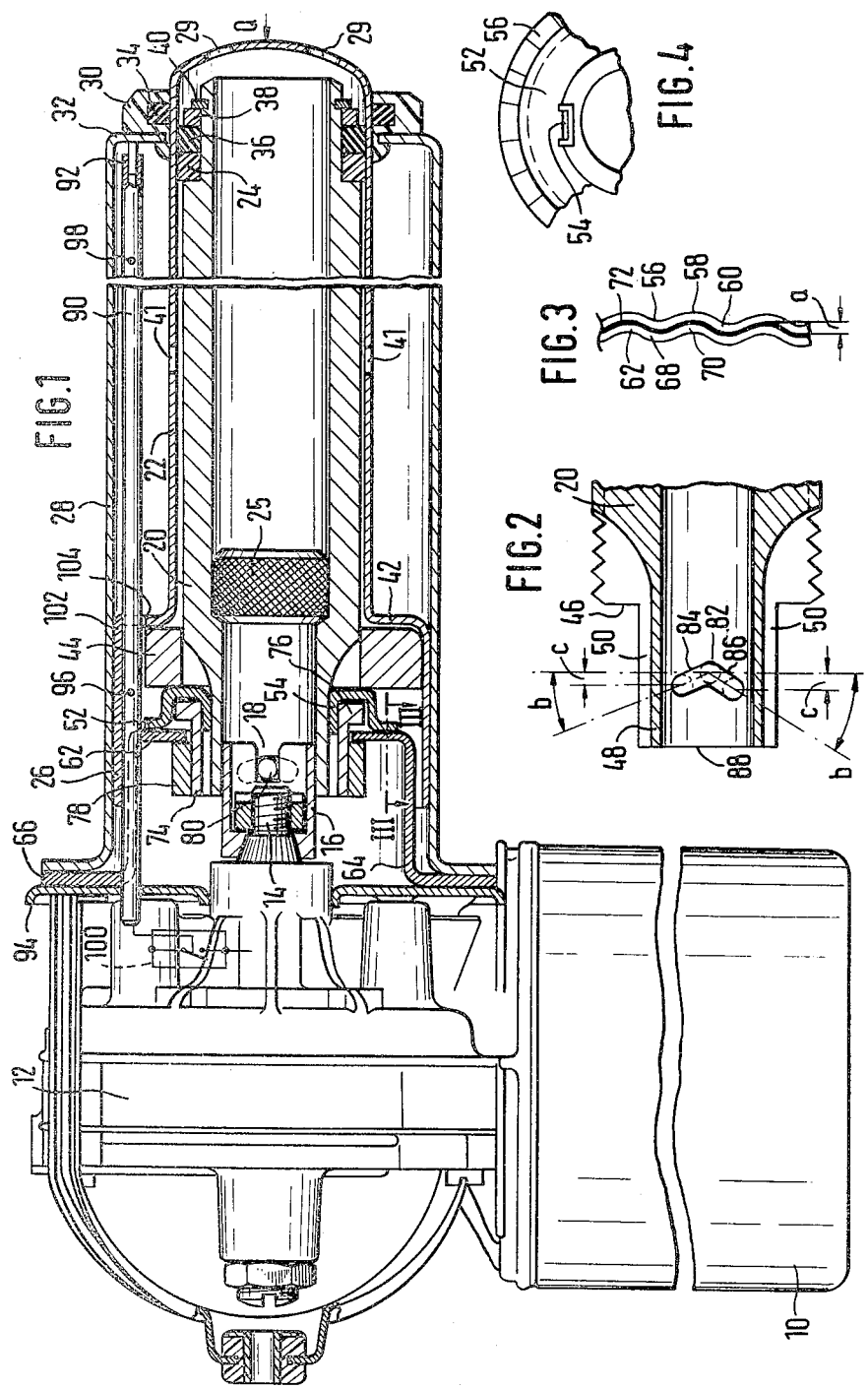

ELECTRIC MOTOR OPERATED ADJUSTING DRIVE

BACKGROUND OF THE INVENTION

The present invention relates to an electric motor operated adjustment drive, particularly for the utilization in mobile processing machines.

Linear adjusting drives are known in which an adjustment member is formed as a solid rod or a pipe with a closed end located in the working space of the drive. In such drive, during retracting and extending of the adjustment member, a relatively great volume variation of the working space takes place, the working space being formed by the adjustment stroke and the entire transverse surface of the adjustment member described by the outer profile of the same. In electric motor operated adjustment drives the working space which receives the adjustment member is not filled with a working fluid as in hydraulic or pneumatic drives. In such adjustment drives, a relatively great air exchange between the working space and the surrounding atmosphere takes place which can lead to a premature dirtying of the drive when it operates in wet, dusty, or the like dirty atmosphere. The parts of the drive can wear out relatively fast, whereby the required adjustment position cannot be exactly attained under the action of vibrations, such as for example vibrations of the machine.

SUMMARY OF THE INVENTION

Accordingly, it is an object of the present invention to provide an adjustment drive which avoids the disadvantages of the prior art.

In keeping with these objects, and with others which will become apparent hereinafter, one feature of the present invention resides, briefly stated, in an electric motor operated adjusting drive having a housing with an opening, a threaded rotary spindle in the housing, an adjusting nut arranged on the spindle axially displaceable and non-rotatable, and an adjustment member arranged in the housing and sealed relative to the latter, as well as actuated by the adjusting nut so as to displace linearly outwardly of the housing through the opening of the latter, wherein the adjustment member is formed by a hollow body which is thin-walled and surrounds the threaded spindle, and means are provided for sealing the adjusting member inwardly relative to the threaded spindle and for sealing the adjustment member outwardly relative to the opening of the housing.

When the adjusting drive is designed in accordance with the applicant's invention, the air exchange during operation of the drive in a respective working space is determined only by the adjustment stroke and the relatively small ring-shaped cross-sectional area of the adjustment member formed as a sleeve or a bushing. Thereby a minimum of volume variations and thereby of air exchange take place. The inner and outer sealing of the adjustment member and the minimization of the air exchange insures protection of the sensitive movable inner parts of the drive and their premature wear. The end portion of the adjustment member which extends outwardly of the drive housing has at least one opening for air exchange between the surrounding atmosphere and a closed chamber formed between the adjustment member and the end side or the wall of the inner opening of the adjusting spindle.

In accordance with another advantageous feature of the present invention, the threaded spindle is provided with a disconnectable rotation-locking means which includes a movable locking member arranged to be locked under the action of reaction force of the adjustment member, and a coupling is provided which connects the driving shaft of the motor with the threaded spindle and provides for axial movement of the latter in the beginning of each adjustment step so as to terminate the locking action of the locking member. In such a construction it is additionally obtained that when an adjustment position is once assumed, it is reliably retained even in conditions of high vibration until the next-following adjustment step.

The air exchange inside the drive housing is improved when, in accordance with still another feature of the present invention, an adjustment nut and another part which crosses the cross section of the drive housing are provided with several axial openings for pressing the aspirated air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a view showing a section of an adjusting drive in accordance with the present invention;

FIG. 2 is a view showing a part of a threaded spindle of the adjusting drive of FIG. 1;

FIG. 3 is a section taken along the line III—III in FIG. 1; and

FIG. 4 is a view showing a portion of an individual element of FIG. 1.

DESCRIPTION OF A PREFERRED EMBODIMENT

The adjusting drive in accordance with the present invention has an electric drive motor 10 on which a transmission 12 is arranged. The transmission 12 has a driving shaft 14 which extends normal to the axis of the motor. A driving bush 16 is non-rotatably mounted on the driving shaft 14 by means of a nut and has two oppositely located radial elongated slots 18 which are open at a free end face of the bush.

An inwardly hollow threaded spindle 20 is supported on the bush 16. The threaded spindle 20 extends inside of a sleeve-shaped or bush-shaped adjustment member 22 and is supported in a sliding ring 24 spaced from the motor and constituted of synthetic plastic material. A filter 25 is inserted in the opening of the threaded spindle 20.

The adjustment member 22 has a portion 26 which is located adjacent to the motor and has an increased diameter. The portion 26 is displaceable and guided in a housing 28 of the drive. The end portion of the adjustment member 22, which is spaced from the motor, is provided with openings 29 for ventilation of the spindle openings and a space is formed between this end portion and the end face of the threaded spindle 20.

The adjustment member 22 is guided in a bush 30 constituted of synthetic plastic material. The bush 30 is injection molded in an opening of a bottom 32 of the housing 28. The adjustment member 22 is sealed outwardly by a sealing ring 34 in the bush 30 and sealed inwardly by a sealing ring 36. The sealing ring 36 together with the sliding ring 24 is firmly retained by a disk 38 and a snap ring 40 on the threaded spindle 20. The annular gap between the adjustment member 22 and the threaded spindle 20 is connected with the remaining inner space of the housing 28 by openings 41 in the adjustment member 22.

An annular shoulder 42 is formed between the portion 26 and the remaining portion of the adjustment member 22. The shoulder 42 abuts against an adjusting nut 44 which is screwed on the threaded spindle 20. In the shown end position of the parts, the adjusting nut 44 assumes a position relative to the threaded spindle 20 in which its end side facing toward the motor extends in a plane in which an annular shoulder 46 of the threaded spindle 20 extends (FIG. 2). At this shoulder 46 the threaded spindle 20 transits into a smaller dome-shaped portion 48 provided with two diametrically opposite elongated grooves 50. A cup-shaped locking member 52 of a rotation-blocking means is arranged on the dome-shaped portion 48 displaceably but non-rotatably. The locking member 52 is provided, for this purpose, at its supporting openings with two inwardly extending and axially folded projections 54 which engage in the elongated grooves 50 of the dome-shaped portion 48 with play at all their sides. The locking member 52 is provided at its outer edge with a flange 56. The flange 56 has a plurality of depressions 58 and elevations 60 which are wave-shaped and distributed over the periphery of the flange 56. They have a height indicated by reference letter a.

The locking member 52 cooperates with a locking disk 62 which is fixedly mounted on the housing. The locking disk 62 is formed by a bottom of a cup-shaped part 64. The latter has a flange 66 which together with the housing 28 is mounted on the transmission 12. The locking disk 62 is also provided with wave-shaped depressions 68 and elevations 70 which correspond to the waves on the flange 56 of the locking member 52 and are provided with rubber coating for noise absorption.

The dome-shaped portion 48 of the threaded spindle 20 has a free end which are supported on the bush 16 of the transmission 12 and extends axially through the locking disk 62. A first ring body 74 is arranged on this end of the dome-shaped portion 48 and has a ring bead 76 which is surrounded by the cup-shaped locking member 52 and abuts against the rubber coating 72 of the locking disk 62.

A second ring body 78 is fitted on the ring body 74 and abuts against the other side of the locking disk 62. Both ring bodies 74 and 78 are connected with one another by a transverse pin 80 which extends into L-shaped grooves 82 of the dome-shaped portion 48 of the threaded spindle 20 (FIG. 2) and the slots 18 of the bush 16. The pin forms a part of a coupling between the driving shaft 14 and the threaded spindle 20. The grooves 82 in the dome-shaped portion 48 have two sections 84 and 86 which are arranged at an angle relative to one another and extend at an angle b relative to a free end face 88 of the dome-shaped portion 48. The construction of the groove 82 provides for a relative movement c between the transverse pin 80 extending in the grooves and threaded spindle 20, when the transverse pin 80 reciprocates relative to the threaded spindle 20 from the end of the groove towards the center of the same. The length of the sections 84 and 86 of the grooves 82 are so selected that the distance c is somewhat greater than the height a of the depressions and elevations in the locking member 52 and the locking disk 62.

A switching bar 90 extends parallel to the threaded spindle 20 in the housing 28. It is supported displaceably on a pin 92 of the bottom 32 of the housing 28 and a disk 94 arranged between the transmission 12 and the flange 66 of the member 64. The switching bar 90 is provided with two transverse pins 96 and 98 which cooperate with the adjusting nut 44 and the annular shoulder 42 of the adjustment member 22 and displace the switching bar 90 when the drive runs into its end position.

The switching bar 90 actuates a double-acting end switch 100 which, as can be seen from the drawing, is mounted on the transmission 12, covered by the disk 94, and connected by a cable with the motor 10. The adjusting nut 44 and the annular shoulder 42 of the adjustment member 22 are provided with recesses 102 and 104 which are distributed uniformly over their periphery. The recesses shown in the drawing serve for extending the switching bar therethrough. The adjusting nut 44 is supported by not shown guiding means displaceably but non-rotatably relative to the transmission 12 in the housing 28. The guiding means is bar-shaped and also extends through the annular shoulder 42 of the adjustment member 22.

In the shown end position, the parts of the drive assume the positions shown in FIG. 1. The transverse pin 80 is located substantially in a central region of the elongated grooves 82 of the threaded spindle 20, and the latter assumes a position in which its annular shoulder 46 abuts against the cup-shaped locking member 52 and the latter completely engages in the waves of the locking disk 62. The adjusting nut 44 assumes its extreme left position on the threaded spindle 20. In this position, the end face of the adjusting nut 44 facing towards the transmission 12 extends substantially in the same place in which the annular shoulder 46 of the threaded spindle 20 extends. The adjustment member 22 abuts with its annular shoulder 42 under the action of the reaction pressure Q of the parts to be adjusted, against the adjusting nut 44 and holds the parts 52 and 62 of the rotation-blocking means in locked position, so that the drive under the action of oscillations or vibrations cannot be adjusted axially.

In order to perform an adjustment step the motor is supplied with current by a not shown switching means and thereby the driving shaft 14 of the transmission 12 is driven in rotation. The transverse pin 80 is rotated via the bush 16, and the end portions of the transverse pin 80 move in the sections 84 and 86 of the grooves 82 of the dome-shaped portion 48 outwardly. Thereby, the threaded spindle 20 displaces rightwardly by the distance c. As a result of this, a torque acts upon the threaded spindle 20, which torque is however absorbed by the rotation-blocking means 52, 62 so that the threaded spindle 20 is first displaced axially, but does not rotate. When the transverse pin 60 displaces at the end of the grooves 82 in the dome-shaped portion 48, the annular shoulder 46 is lifted from the locking member 52 to such an extent that its wave-shaped flange 56 slides out of the wave-shaped locking disk 62 under the action of axial deviation. Starting from this position, the threaded spindle 20 begins to rotate with the driving shaft 14, whereby the adjusting nut 44 and the adjustment member 22 displace axially until the desired adjustment position is attained and the motor 10 is turned off. The torque acting from the motor upon the threaded spindle 20 and causing the disengagement of the rotation-blocking means 52, 62 ceases to act. Thereby, the reaction force Q, via the adjustment member 22 and the adjusting nut 44, displaces the threaded spindle 20 with reverse rotation of the transverse pin 80 to the central section of the grooves 82, by the distance c toward the transmission 12. The parts 52 and 62 of the rotation-blocking means again engage one another and hold the threaded spindle 20 so that it cannot rotate.

During the restoring process, the arrow-shaped construction of the grooves 82 of the dome-shaped portion 48 performs the same axial displacement between the threaded spindle 20 and the parts 52 and 62 of the rotation-blocking means. The transverse pin 80 is prevented against an axial displacement by the ring bodies 74 and 68 which are supported on the locking disk 62 fixedly mounted on the housing.

The volume variations in the housing 28, caused by the adjustment movement, are limited by the adjustment stroke and the volume of the thin-walled adjustment member 22 which is extended out of the housing and retracted into the same. The thus attained minimization of the air exchange between wet and dirty surrounding atmosphere and the interior of the drive in connection with the sealing of the adjustment member 22 inwardly and outwardly, guarantees that the movable parts of the drive are reliably protected during a long time against dirtying and wear.

It will be understood that each of the elements described above, or two or more together, may also find a useful application in other types of constructions differing from the types described above.

While the invention has been illustrated and described as embodied in an electric motor operated adjusting drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric motor operated adjusting drive, comprising a housing having an opening; a threaded rotary spindle arranged in said housing and having an axis; an adjusting nut arranged on said spindle axially displaceable and non-rotatable; an adjustment member arranged in said housing and sealed relative to the latter, said adjustment member being actuated by said adjusting nut so as to displace linearly outwardly of said housing through said opening, said adjustment member being formed by a hollow body which is thin-walled and surrounds said threaded spindle; means for sealing said adjustment member inwardly relative to said threaded spindle; and means for sealing said adjustment member outwardly relative to said opening of said housing.

2. An adjusting drive as defined in claim 1, wherein said hollow body which forms said adjustment member is a sleeve.

3. An adjusting drive as defined in claim 1, wherein said hollow body which forms said adjustment member is a bushing.

4. An adjusting drive as defined in claim 1, wherein said adjustment member is guided in said housing at two locations spaced from one another in axial direction and has two axial ends one of which faces away from a motor and supports said threaded spindle.

5. An adjusting drive as defined in claim 4, wherein one of said locations is formed by said opening of said housing so that said adjustment member is guided in said opening of said housing.

6. An adjusting drive as defined in claim 4, wherein said adjustment member has a first portion located adjacent to the motor and having a greater diameter and a second portion spaced from the motor and having a smaller diameter, said housing having an inner wall guiding said first portion of said adjustment member.

7. An adjusting drive as defined in claim 6, wherein said adjustment member has a shoulder formed between said first portion and said second portion, said shoulder being arranged to abut against said adjusting nut.

8. An adjusting drive as defined in claim 4, wherein said first mentioned sealing means includes a first sealing member arranged in the region of said one axial end of said adjustment member; and further comprising a sliding ring which is also located in said region of said one axial end of said adjustment member and arranged for supporting said threaded spindle.

9. An adjusting drive as defined in claim 5; and further comprising a sliding bush arranged to guide and seal said adjustment member in said opening of said housing, said sliding bush surrounding said adjustment member and carrying a second sealing member of said second mentioned sealing means.

10. An adjusting drive as defined in claim 7; and further comprising rotation-blocking means including a movable locking member which is retained in locked condition under the action of reaction forces of said adjustment member, and coupling means connecting a driving shaft of the motor with said threaded spindle and arranged to provide, in the beginning of each adjustment step, for axial movement of said threaded spindle and thereby for termination of the locking condition of said locking member.

11. An adjusting drive as defined in claim 10, wherein said movable locking member is formed as a cup disc which is displaceable on but non-rotatable relative to said threaded spindle and cooperates with said shoulder of said threaded spindle.

12. An adjusting drive as defined in claim 11, wherein said blocking means further includes a locking disc which is fixedly connected with said housing and extends normal to said axis of said threaded spindle, said locking disc having a wave-shaped wall portion, said cup disc having a wave-shaped flange engaging with said wave-shaped wall portion of said locking disc under the action of reaction force transmitted through said shoulder.

13. An adjusting drive as defined in claim 12, wherein said locking disc is formed by a bottom of a cup-shaped element having a connecting flange, said cup-shaped element together with said housing being mounted on a transmission of the motor.

14. An adjusting drive as defined in claim 12, wherein said coupling includes a transverse pin connected with the driving shaft for joint rotation therewith and having two ends, said threaded spindle having a hollow dome-shaped portion engageable with the driving shaft of the motor and having two arrow-shaped grooves into each of which a respective one of said ends of said transverse pin extends.

15. An adjusting drive as defined in claim 14, wherein said dome-shaped portion of said spindle has an end face, each of said arrow-shaped grooves having two sections which are inclined relative to said end face at an angle which is greater than the angle of friction of the respective parts.

16. An adjusting drive as defined in claim 14; and further comprising a bush arranged on the driving shaft of the motor, said dome-shaped portion of said threaded spindle is displaceably supported on said bush and extends through said locking disc of said blocking means.

17. An adjusting drive as defined in claim 16, wherein said dome-shaped portion of said threaded spindle carries two abutment rings arranged at opposite sides of said locking disc, one of said abutment rings having an axial projection engaging under the other of said abutment rings, said ends of said transverse pin extending through said abutment rings.

18. An adjusting drive as defined in claim 1; and further comprising a switching bar extending parallel to said threaded spindle and displaceable in an axial direction, said switching bar having two projections which are axially coupled with said adjusting nut and said adjustment member, and an end switch actuating said switching bar.

19. An adjusting drive as defined in claim 1, wherein said adjusting nut and at least a portion of said adjustment member are provided with a plurality of ventilating openings allowing air exchange inside said housing.

* * * * *